Patented Dec. 8, 1953

2,662,021

UNITED STATES PATENT OFFICE 2,662,021

FURNACE BRICK

Frank O. Keltz, Latrobe, Pa., assignor to McFeely Brick Company, Latrobe, Pa., a corporation of Pennsylvania No Drawing. Application October 17, 1951,
Serial No. 251,819

4 Claims. (Cl. 106—63)

This invention refers to the manufacturing of silica refractories, such as are used in the constructing of metallurgical furnaces, soaking pits, coke ovens, electrical furnaces, open-hearth furnaces and other types of industrial furnaces.

Silica bricks have commonly been made of ganister and siliceous gravel or sand with which there is usually associated a substantial percentage of $Al_2O_3$, there being also earthy matter included in the siliceous material.

My invention has for its object the provision of a silica brick or the like wherein there is the desired low percentage of $Al_2O_3$, and without a substantial quantity of alkalies, the bricks having good mechanical strength to avoid breakage through handling and after firing, and being highly resistant to erosion and spalling and to heat shock.

In the practice of my invention, I select ganister and gravel that do not have appreciable quantities of alumina, alkalies, or iron, for the purpose of obtaining highly refractory bricks. Such bricks possess the desired refractoriness, but are physically weak. To overcome this fault, I have found it advantageous to add titanium oxide to the batch, thereby increasing the strength of the brick. Such bricks may contain a total of .10% to .50% $TiO_2$.

At any rate, approximately pure ganister and siliceous gravel, or siliceous gravel alone, will be ground to desired grain sizes and mixed with lime and $TiO_2$ in powdered or granular form, and sufficient water for the shaping of bricks which will be dried and fired in the usual manner. The ganister can be either raw or calcined, or a mixture of both. Some mixtures suitable for the practice of my invention are as follows:

Example 1

| | Pounds |
|---|---|
| Ganister raw | 100 |
| Ganister calcined | 100 |
| Siliceous gravel | 1000 |
| Lime | 24 |
| $TiO_2$ | 5 |

Example 2

| | Pounds |
|---|---|
| Siliceous gravel | 1200 |
| Lime | 24 |
| $TiO_2$ | 5 |

The siliceous material (ganister and gravel) is in graded sizes and will all pass through a No. 4 screen.

.4% to 3.5% will pass through a No. 6 screen.
13.2% to 22.2% will pass through a No. 12 screen.
18.3% to 22.0% will pass through a No. 20 screen.
7.5% to 8.5% will pass through a No. 30 screen.
6.0% to 6.6% will pass through a No. 40 screen.
6.2% to 6.8% will pass through a No. 50 screen.
7.9% to 8.4% will pass through a No. 80 screen.
2.2% to 2.8% will pass through a No. 100 screen.
Balance will pass through a 200 mesh screen.

The titanium oxide may be in the form of either powder or small grains and suitably may be of rutile which contains 90% to 100% titanium oxide and is commercially free of alumina oxides ($Al_2O_3$) and alkalies.

Example 3

| | By weight, per cent |
|---|---|
| Ganister either raw or calcined | 16 to 33 |
| Siliceous gravel | 65 to 81 |
| Lime | 1.5 to 2.5 |
| $TiO_2$ | .10 to .50 |

Example 4

| | By weight, per cent |
|---|---|
| Siliceous material | 97 |
| Lime | 1.5 to 2.50 |
| $TiO_2$ | .10 to .50 |

The lime acts as a bonding agent for the material while the bricks are being dried and fired. After drying, the bricks are fired by gradually heating them to a maximum of 2650° F. to 2750° F. in seven or eight days and held at high temperatures for two or three additional days. This firing develops a permanent bond which will sustain the bricks during handling and subsequent industrial use.

The amount of fluid glass formed in silica refractories depends upon the amount of alumina, iron and alkalies present. As erosion takes place at elevated operating temperatures, it is advantageous to have a minimum of glass in the product. As the alkalies are low melting elements, it follows that the eutectic melting point is influenced greatly by their presence and materials should be selected with this in mind. Therefore, I have eliminated some naturally-occurring alumina, with the accompanying iron and alkalies, by selection and preparation of the raw materials and have found that by adding 0.10% to 0.50% of $TiO_2$, I obtain a brick that has the strength of conventional silica bricks which contain 1.25% to 2.00% $Al_2O_3$.

To emphasize the toughness of the high purity silica brick which I have produced by the addition of $TiO_2$, reference is made to the time required to make comparable "cutting" tests by using a masonry saw which is familiar to those experienced in the industry. The high purity silica brick with no $TiO_2$ added, across an area of 17.717 square inches was cut through in 78.5 seconds, while a high purity silica brick with the same chemical analysis plus 0.14 $TiO_2$ required 165 seconds to make this cut.

I claim as my invention:

1. A silica brick formed of high silica material that is substantially free of alkalies and iron, and also containing lime and titanium oxide, the lime being approximately 2% (by weight of the mixture) and the titanium oxide being from .10% to .50% of the mixture, by weight.

2. A silica brick comprising:

| | By weight, per cent |
|---|---|
| High silica material substantially free of alkalies and iron | 96 to 97 |
| Lime | 1.5 to 2.5 |
| $TiO_2$ | .10 to .50 |

3. A silica brick comprising:

| | By weight, per cent |
|---|---|
| Ganister | 16 to 33 |
| Siliceous gravel | 65 to 81 |
| Lime | 1.5 to 2.5 |
| $TiO_2$ | .10 to .50 | the ganister and gravel being substantially free of alkalies and iron and being of high silica material.

4. A silica brick comprising:

| | By weight, per cent |
|---|---|
| Ganister (raw) | 8 |
| Ganister (calcined) | 8 |
| Siliceous gravel | 81 |
| Lime | 1.5 to 2.5 |
| $TiO_2$ | .10 to .50 | the ganister and gravel being substantially free of alkalies and iron and being of high silica material.

FRANK O. KELTZ.

References Cited in the file of this patent

UNITED STATES PATENTS

| Number | Name | Date |
|---|---|---|
| 2,351,204 | Harvey et al. | June 13, 1944 |

FOREIGN PATENTS

| Number | Country | Date |
|---|---|---|
| 398,578 | Germany | 1924 |